May 3, 1955  E. F. BRADY  2,707,617
APPARATUS FOR AND METHOD OF ORIENTING SIDE WALL CORES
Filed Nov. 24, 1950  3 Sheets-Sheet 1
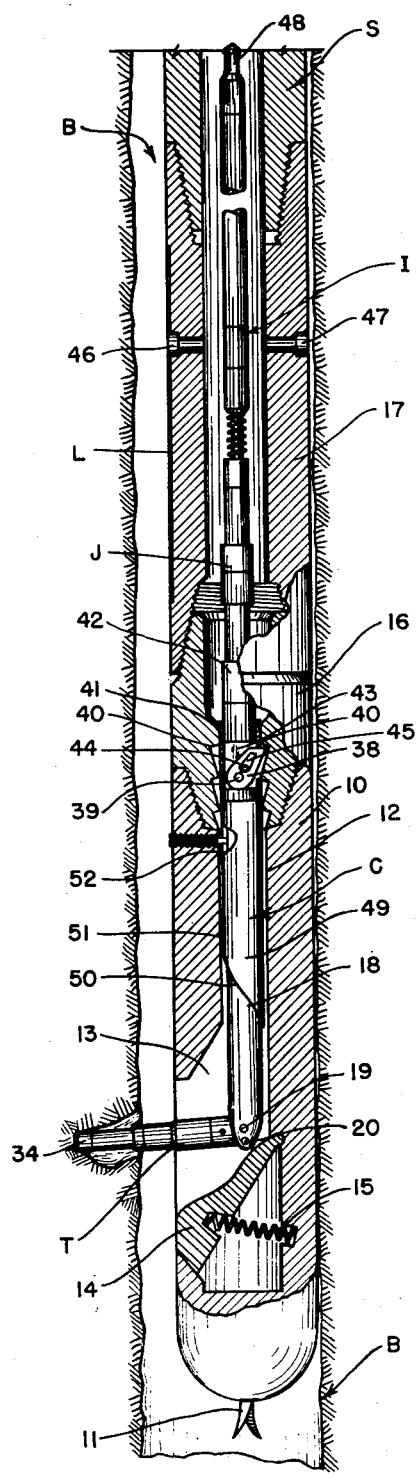
FIG.—1
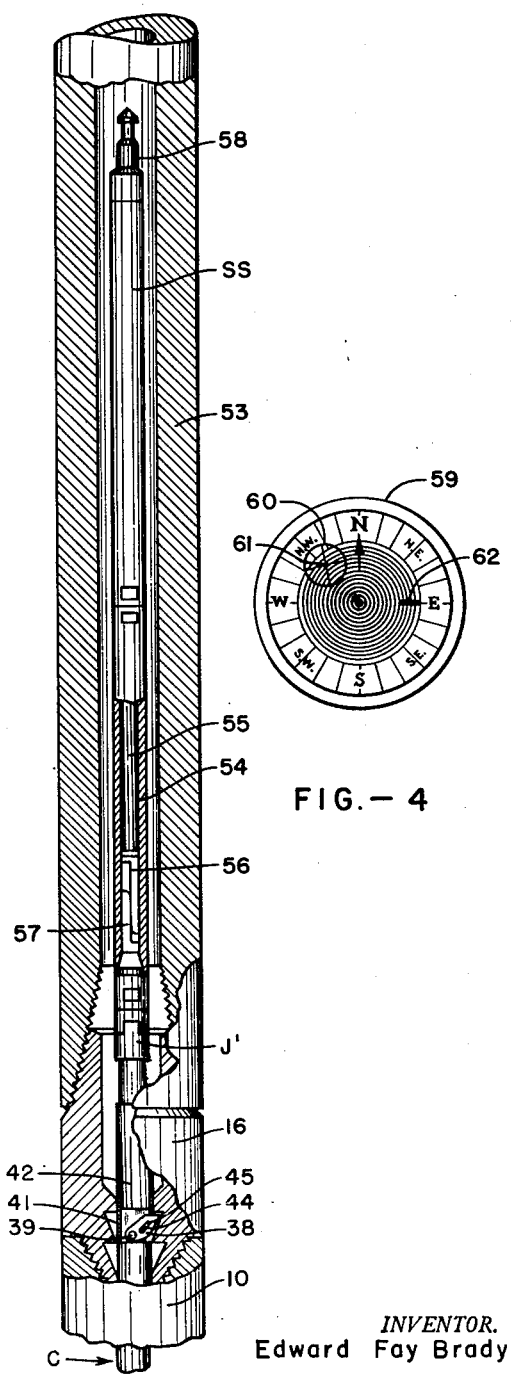
FIG.—3
FIG.—4
INVENTOR.
Edward Fay Brady
BY
Lamphere and Van Valkenburgh
ATTORNEYS

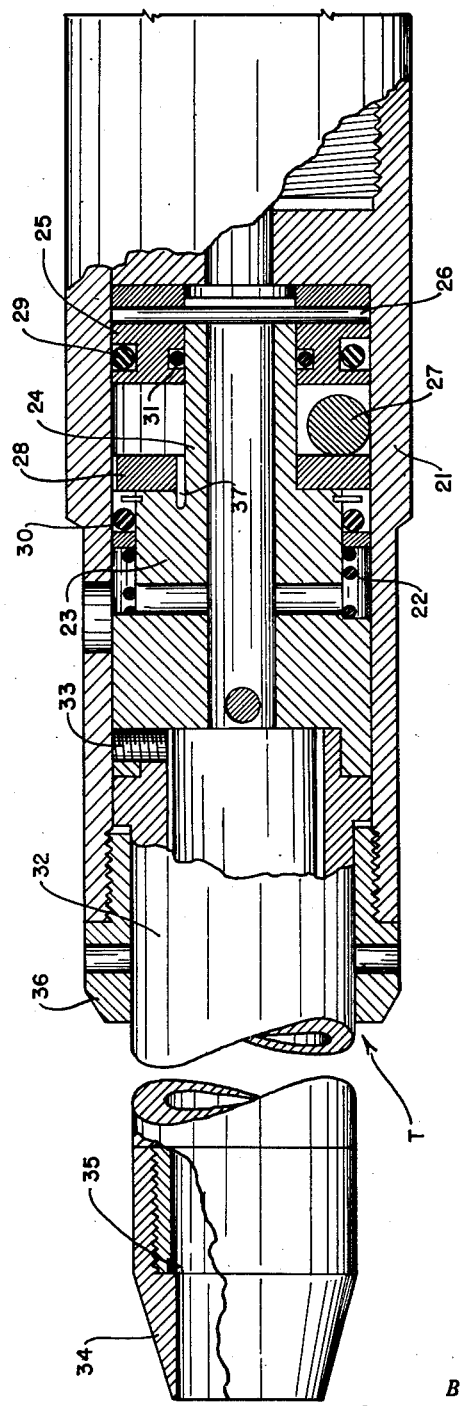
FIG. — 2
INVENTOR.
Edward Fay Brady

May 3, 1955  E. F. BRADY  2,707,617
APPARATUS FOR AND METHOD OF ORIENTING SIDE WALL CORES
Filed Nov. 24, 1950  3 Sheets-Sheet 3
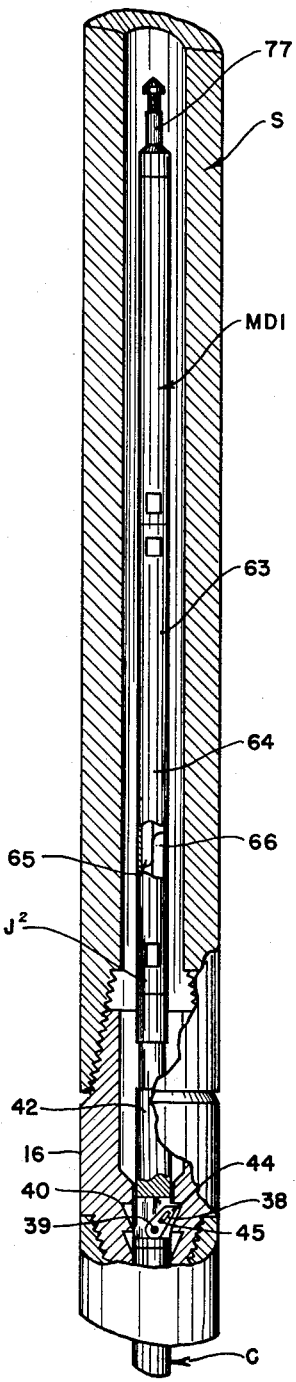
FIG.—5
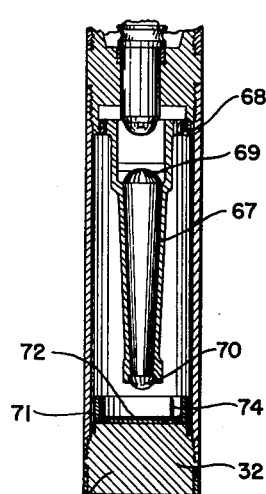
FIG.—6
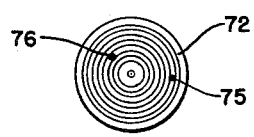
FIG.—7
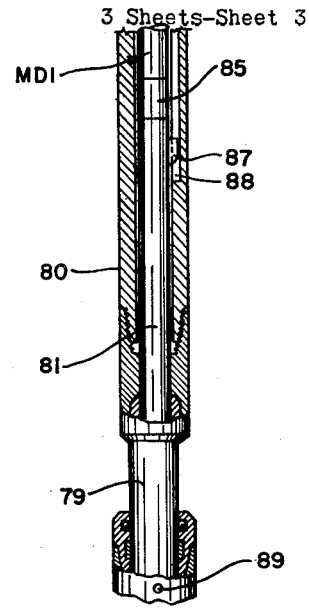
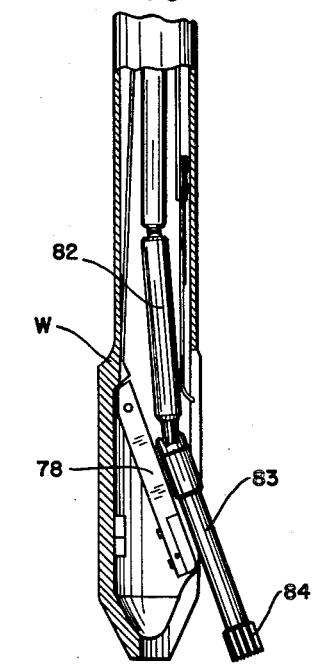
FIG.—8
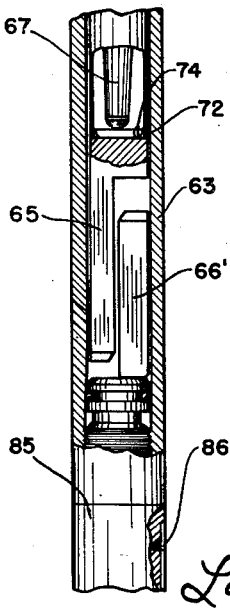
FIG.—9
*INVENTOR.*
Edward Fay Brady
BY Lamphere and Van Valkenburgh
ATTORNEYS

United States Patent Office 2,707,617
Patented May 3, 1955

2,707,617

APPARATUS FOR AND METHOD OF ORIENTING SIDE WALL CORES

Edward Fay Brady, Long Beach, Calif., assignor to Eastman Oil Well Survey Company, Denver, Colo., a corporation of Delaware Application November 24, 1950, Serial No. 197,223

8 Claims. (Cl. 255—1.4)

This invention relates to the taking and orienting of samples in the form of cores from the earth's formation, and more particularly cores which have been taken from the side walls of an earth bore.

One of the objects of the invention is to establish an improved method of obtaining data relative to a core taken from the wall of an earth bore so that said core can be readily oriented and thus acquire knowledge as to the exact location the core had in the earth's strata.

Another object is to provide apparatus whereby a survey instrument can be used with a side wall sampler and thereby obtain such data that the sample can be oriented.

Still another object is to produce an improved method of obtaining data for orienting side wall cores which will permit the employment of various types of survey instruments with various types of side wall sampling tools.

Yet another object is to associate with a side wall core sampling tool means whereby, when the core is obtained, information will also be recorded from which can be determined the position of the core taking tool when the core was taken.

A further object is to provide a side wall core sampler tool with means for indicating which is the low side thereof at the time when the sample is obtained and to associate therewith means whereby a survey instrument can be employed to obtain additional recorded data and thus, from all the data, the sample core can be oriented when removed from the well bore.

A still further object is to provide an improved means and method of obtaining data to orient a side wall sample core by the use of a survey instrument capable of recording only the inclination of the well bore where the same is obtained and the relation of the inclination to the position of the sample, it already being known what the direction of inclination is.

Yet a further object is to provide an improved means and method of obtaining data to orient a side wall sample core by the use of a survey instrument capable of recording the inclination of the well bore where the sample is obtained and the relation of said inclination to the position of the sample and further the direction of the inclination.

Other objects of my invention will become apparent from the following description taken in connection with the accompanying drawings in which:

Figure 1 is a longitudinal section view of a drilling structure showing a punch type side wall sampler in the position assumed to obtain an earth formation sample, together with means associated therewith, and a survey instrument of the magnetic type whereby data is obtained in accordance with my invention to enable the sample to be oriented when removed from the bore;

Figure 2 is an enlarged longitudinal sectional view of the sampler showing the structure employed to obtain data indicating the low side of the sample when it was cut from the earth's formation.

Figure 3 is a longitudinal sectional view similar to the upper part of Figure 1, but showing a single shot survey instrument capable of obtaining a record of both inclination and direction of inclination and thus capable of being employed to obtain desired data so that the sample can be oriented when taken from the bore;

Figure 4 is a top view of a "slug" or photographic disc showing the recorded data obtained by the single shot instrument;

Figure 5 is a longitudinal sectional view similar to Figure 4 but showing the use of still another type of survey instrument which may be employed to obtain data so that the sample can be oriented, the particular instrument shown being called a photographic drift indicator;

Figure 6 is a longitudinal sectional view of the plumb bob and recorder disc structure used in the instrument of Figure 5;

Figure 7 is a top view of the recorder disc of sensitized paper associated with the plumb bob; and Figures 8 and 9 are views partly in section showing my invention being employed to obtain data for orienting a side wall sample when the sample is obtained by a rotary type of sampler.

*Description of Figure 1 structure*

Referring to the drawings in detail and first to Figures 1 and 2, the drill stem of a rotary drilling rig is indicated at S, this stem being in the form of pipe sections screwed together and extending from the surface down to bore B being drilled in the earth's formation, all as shown in Figure 1. On the lower end of the drill stem S is mounted a side wall core sampler generally indicated by the letter C and by means of which samples of the earth's strata can be obtained, said sample being taken from the side wall of the bore B being drilled. The particular sampler disclosed is of the punch type, being similar to that shown in Oswald U. S. Patent No. 2,358,470 issued September 19, 1944, for Sampling Device. It is to be understood that this disclosed sampler is by way of example only and that, as will be later described, other types of samplers can be used as part of the structure employed in carrying out my invention for orienting samples which are taken from the side wall of an earth bore.

The sampler C shown has a sub or drill body 10 provided at its lower end with a suitable drill bit 11 whereby drilling can be performed. The drill body 10 is provided with a longitudinal bore 12 which, at its lower end, communicates with an opening 13 extending to the outer wall of the drill body and into the well bore. At the lower end of the bore is an inclined deflector member 14 suitably pivoted to the drill body and extending across the bore at the opening 13. A suitable coil spring 15 acts on the deflector member so as to urge it upwardly and outwardly toward the opening 13. The deflecting member has a suitable dished and inclined upper surface so that when a member is moved downwardly through the bore 12 it will be deflected outwardly toward the opening 13 by the surface of the deflecting member.

The drill body 10 is secured to a special sub 16 and this sub in turn is connected by means of a magnetic sub 17 to the end of the drill stem S. The connections between the subs, the drill stem and the drill body are made by suitable screw-threaded joints.

The sampler C consists of a mandrel member 18, to the lower end of which is connected the sampling tube T. This sampling tube is shown in detail in Figure 2 and the inner end thereof is pivoted to the mandrel member 18 by a pin 19. In addition to the pivot pin 19 there is a shear pin 20, the purpose of which is to hold the tube T aligned with the mandrel during the insertion of the sampler. When the sampler passes into the bore 12, the tube T will engage the top inclined surface of the deflecting member 14, thus causing the tube to swing out of alignment with the mandrel 18 toward the opening 13. When this swinging movement takes place the shear pin 20 will be sheared off.

The sampling tube T, as shown in detail in Figure 2, has a body 21 provided with a bore 22. Within this bore is a piston 23 provided with a rearwardly extending portion 24. At the rear end of this projecting portion is mounted a second piston member 25. This second piston member is connected to the main piston member by a shear pin 26. The piston 25 is spaced from the piston 23 and positioned therebetween is a hard steel ball 27. Associated with the piston 23 is a soft disc 28 made of aluminum or other suitable material which can be acted upon by the ball 27 whenever there is relative movement of the piston 23 toward the piston 25, this relative movement placing a dent in the disc. Suitable O-ring sealing means 29 and 30 can be associated with the pistons, as shown, in order to prevent fluid or other material from entering into the space where the ball is positioned. An O-ring seal 31 can also be employed between the piston 25 and the projection 24 on which it is mounted. The piston 23 has connected to its forward end the sampling cylinder 32, said connection being made by a set screw 33. The sampling cylinder projects out of the body 21 of the sampling tube and has on its end a hardened cone-shaped tip 34. Adjacent the tip the cylinder member carries a scribe element 35 which will make a mark on the core which is cut and received into the tube when the sample is taken. An annular nut 36 associated with the end of the body 21 holds the structure together with the pistons in the bore. In order that there may be a definite known relationship between the soft disc 28 and the scribe, the key 37 which connects the disc to the piston 23 is arranged to be in alignment with the scribe. The piston 23 and the body portion at the end of the bore are provided with suitable passages so that as the sample is received into the sampling cylinder by a punching operation, the fluid or other material in the cylinder can be ejected rearwardly.

At the upper end of the mandrel 18 of the sampler C there is pivotally mounted a latching member 38, said member being pivoted in a longitudinal slot by means of a pin 39. The latch is designed to swing outwardly through the rectangular slot and to engage with any of a series of shoulders 40 which are provided in the bore of the special sub 16. Just above the latch and slidable in a sleeve 41 carried by the upper end of the mandrel is a rod 42. The lower end of this rod has a slot 43 in which the latch 38 is received, and extending across this slot is a pin 44 which projects through an opening 45 in the latch. With this arrangement it will be seen that as the rod 42 is pulled upwardly there will be relative movement between the rod and the mandrel and this relative movement will result in the pin 44 so acting on the edge of the opening in the latch as to swing the latch inwardly and disengage it from a shoulder 40 with which it is engaged.

To the upper end of the rod 42 there will be attached by a joint J a suitable survey instrument I. This instrument, shown in Figure 1, is of the magnetic type and is commonly known in the trade as a "bottom hole orientation instrument." The details thereof are not believed necessary to describe in this application as the instrument is well known. For details of the instrument reference is had to my co-pending application Serial No. 81,134 filed March 12, 1949, for Core Orienting Apparatus, now Patent No. 2,657,013. The instrument is capable of recording the angle of inclination of the bore hole and this is accomplished by means of an angle unit which is mounted directly above a magnetic position indicator. Also in the instrument is a battery section and a time control unit. The magnetic position indicator has a magnetic rotor and this carries the recording disc. The angle unit above the magnetic rotor has a plumb bob free to swing in any direction. When the time control unit is set it causes a lamp to be ignited and the rays thereof will cause a dot to be made on the sensitized disc carried by the magnetic rotor, this dot resulting from lens carried on the plumb bob, all in a well known manner. In order that the position of the magnetic rotor will be known when the instrument is operated and the record made on the sensitized disc to indicate the angle of inclination of the bore, the magnetic sub 17, already referred to, carries in its wall magnets 46 and 47 which are of different polarity and diametrically positioned. When the magnetic sub is placed in the string between the drilling stem and the special sub 16, one magnet 46 is arranged, if possible, to be in alignment with the opening 13 in the drill body at the lower end of the drill string. This is shown by the index line L disclosed in Figure 1. Thus, there will be a known relation between the opening 13 through which the sampling tube is moved to obtain the sample and the sensitized disc in the survey instrument. In event line L cannot be placed in alignment with the window when the joints are screwed up, then nevertheless there will be a known relationship between line L and the window, which is ascertained by measuring the angle therebetween.

At the upper end of the survey instrument there is provided a spear 48 for attachment by means of an overshot device of a suitable wire line whereby the survey instrument and the sampler C, as connected together, can be lowered into the drill stem whenever a sample is desired to be taken. The overshot also permits the instrument and sampler to be "go-deviled" into the well and then recovered by a wire line.

*Operation of the structure of Figure 1*

In using the apparatus described to obtain a side core sample and the necessary data to orient said sample after it is removed from the bore, the survey instrument I will be connected to the sampling device C, as shown, and then lowered into the drill stem, which stem will have secured to its lower end the magnetic sub 17, the special sub 16 and the drill body 10, all as shown in Figure 1. Before lowering the instrument and the sampler the instrument, of course, will have had its time mechanism so set that the instrument will not operate until the sampler has been placed in the drill stem and the sample taken. As the instrument and the sampler are lowered into the well on the line connected to the spear head 48 and it reaches the lower end of the drill stem, the sampler will move into the bore 12 and when the sampler tube engages the deflecting member 14 at the bottom of the bore the sampler tube will be swung laterally toward the opening 13, thereby shearing the shear pin 20. As the sampler tube T is deflected outwardly through the opening 13, it will engage the wall of the bore. When this happens the latch 38 will be in a position so it will engage one of the shoulders 40 in the special sub 16. During the lowering of the survey instrument and the sampler, the drill stem will be maintained in a position so as to be off the bottom of the hole if the sample is to be taken closely adjacent said bottom.

To insure that the sampler will pass into the bore 12 in the proper position so that the sampler tube T can be deflected toward the opening by pivot movement on pin 19, the sampler mandrel is provided with a sleeve 49 cut at an angle at its lower end to provide the guide edges 50 leading to a longitudinal slot 51 in the sleeve. The drill body has a pin 52 projecting into the bore 12 with which the guide edges groove can cooperate. Thus, as the sampler enters the bore one of the guide edges 50 formed by the angle cut will cooperate with the pin 52 and turn the sampler into a position so that the sampler tube can be swung toward the opening and the shear pin severed as the sampler moves downwardly and the pin 52 is received in the slot 51. The arrangement insures that the sampler mandrel will always go into the bore 12 in one predetermined position.

With the sampler and instrument in the bottom of the drill stem and the sampler latched in the bore 12 of the drill body 10 and the outer end of the tubular sampler engaged with the bore wall, a sample can be taken by allowing the drill stem to move downwardly. This will result in the cylinder 32 of the sampling tube being punched into the wall and earth material caused to be cut and moved into the cylinder member. After this is done the drill stem is allowed to remain in the sample taking position until the desired time has elapsed to cause the survey instrument to operate and the inclination of the bore hole obtained. A sufficient time should be allowed to elapse between the time of taking the sample and the operation of the survey instrument so as to allow the plumb bob to come to a rest.

Because of the construction of the sampler tube T, it will be noted that at the time the sample is taken a record will be made of the low side of the sample obtained. This is accomplished by the steel ball 27 and the soft recording disc 28 in the sampling tube. When the cylinder member 32 of the sampling tube is punched outwardly into the wall by the lowering of the drill stem, the shear pin 26 will be sheared off and as a result the piston 23 will move relatively to the piston 25, thereby jamming the ball 27 between the piston 25 and the soft recording disc to make a dent in said disc. This dent will be on the low side of the disc because the ball is free to roll to the low side of the body 21 before the sample was taken by a punching operation. It will also be noted that when the sample is taken and when the sample or core moves into the cylinder 32, this sample will be scratched by the scribe 35 and it will be known what relationship this mark has to the soft recording disc 28, since the scribe has a definite relation with the key which holds the recording member 28 to the piston 23.

After the instrument has operated, this instrument and the core sampler C can be taken from the drill stem by pulling up on the line which will be attached to the spear head 48. When the spear head 48 is pulled, it will move the instrument I upwardly and also the rod 42. This upward movement of the rod 42 relative to the sampler C will operate the latch to disconnect it from the engaged shoulder 40 and then the instrument and sampler will both be free to be pulled out of the drill stem.

When the sample taken is removed there will be present all data necessary to orient this sample and ascertain the exact position it had in the earth's formation. From this orientation the dip and strike of the formation penetrated may be determined. By the scribe mark on the sample and the indentation on the soft metal record disc it will be known which is the low side of the core after it has been removed from the well bore and tube. From the record made by the survey instrument it will be known what was the angle of inclination of the bore hole where the sample was taken. Because of the known relationship between the magnet 46 in the sub and the hole 13 in the drill body at which the sampling tube move doutwardly to obtain the sample, it will then be known what position the sample had with respect to the axis of the bore. There will now be no difficulty in orienting the core if the direction of the inclination of the bore is known. Let it be assumed that this direction is already known as the result of the use of a survey instrument run into the hole. If the direction is not known, a survey instrument, which will give the direction of the inclination can be lowered into the bore and this information obtained. Such an instrument could be a so-called single shot or multiple shot instrument in which is embodied not only an angle unit but a compass. To know the relationship between the record on the sensitized disc of the survey instrument and the index line L and hole through which the sampling tube was projected to obtain the sample, the magnetic position indicator of the instrument can be placed in a suitable surface reader of well known construction, which reader will have a pair of diametrically positioned magnets corresponding to those carried by the magnetic sub 17. This will result in the sensitized disc on the magnetic rod of the instrument assuming a position identical with that it had with respect to the magnetic sub when in the well bore; thus the relationship of the low side of the hole to the position of the sampling tube when the sample was obtained will become known.

*Description of Figure 3 structure and operation thereof*

Referring to Figure 3, there is shown apparatus for carrying out my method of orienting the side wall sample when it is desired to use what is known as a "single shot" survey instrument. This instrument not only is capable of recording the inclination of the bore where the sample is being taken, but also recording the direction of inclination, all of which is accomplished by a plumb bob and a compass, together with time controlled photographic means. As shown in Figure 3, the lower end of the drill stem is provided with a drill collar 53 which is made of a non-magnetic material in order that the compass within the instrument may operate properly. To the lower end of this drill collar 53 is attached the special sub 16 already referred to in describing the structure of Figure 1, and below this is the drill body 10 having the bore 12 and other structure into which the sampler C, together with the sampler tube, can be positioned and locked in the special sub 16 by means of the latch 38.

The single shot survey instrument being employed is indicated by the letters SS and the casing 54 in which the instrument is positioned is arranged to be attached to the rod 42 at the upper end of the sampler C by means of a special joint J¹. The instrument 55 is contained in a non-magnetic barrel 54. The lower end of the instrument has an orienting leg 56 and this leg is arranged to cooperate with another orienting leg 57 carried by the lower end of the casing 54 and arranged to form a part of the joint J¹. The upper end of the single shot instrument has mounted thereon a spear head 58 whereby an overshot device carried on the end of a suitable wire line can be connected to the instrument and sampler and the whole structure removed from the lower end of the drill stem.

Since the single shot instrument is of well known construction, it is not believed necessary to describe it in detail. As already mentioned, the instrument contains a plumb bob whereby the inclination of the bore hole can be determined and there is also provided a compass. To record the data desired, that is, the angle of inclination of the plumb bob and the direction of inclination with respect to magnetic north, the instrument contains a photographic disc commonly called a "slug" and this is shown in Figure 4, indicated by the reference numeral 59. This slug or disc has sensitized photographic paper and is positioned in the instrument so that when exposed by the time controlled photographic means including lamps, there will be placed on the disc an image of the compass and the plumb bob, which image can be brought out by developing the disc. Such a disc, already developed, is the one shown in Figure 4. It will be noted that this disc has thereon the points of the compass and an image of cross hairs carried by the lower end of the plumb bob indicated at 60. The center of these lines will be the point 61 indicating the angle of inclination. It will further be noted that the disc has a series of concentric lines and the distances between these lines indicates predetermined angles of inclination. Thus, on the particular disc shown, it will be readily ascertained when the disc is developed that the angle of inclination or drift is eleven and one-half (11½) degrees (considering each concentric line to represent a degree as the lines are counted outwardly from the center of the disc), and a bearing or direction of the angle of inclination is northwest. Photographed by the photographing means will also be an image of a lug indicated at 62 on the disc of Figure 4. This image results from a lug which is carried by the casing of the instrument and projects inwardly. The lug is placed just out of the way of the plumb bob. With this image of the lug on the developed disc, it will be known exactly what relationship the disc had to the barrel in which the instrument was positioned at the time of exposure. Since the barrel of the instrument has a known relationship to the core sampler C, which known relationship is accomplished by the orienting legs 56 and 57 and the connecting joint J¹ between the instrument and the sampler, it can be ascertained what relationship the disc had with respect to the sampler tube T when the sample was obtained, becauses the picture on the disc will be obtained shortly after the sample is taken and before the sample is removed from the drill stem. After the sample is taken and the survey instrument operated, the sampler and the survey instrument can be removed from the drill stem by running a wire line into the drill stem so an overshot device on the end of the line can be engaged with the spearhead 58. With an upward pull of the line the latch 38 will be disengaged, as already described, and the instrument, together with the sampler removed from the stem.

All the information is now available to orient the sample taken. It will be known which is the low side of the core and it will also be known from the developed disc what position this disc had relative to the window in the sampler through which the tube was projected to obtain the sample. It will therefore only require simple calculations to orient the core taken by the sampling tube and thus determine exactly what position it had in the earth's strata before it was removed therefrom.

*Description of Figures 5 and 6 structure and operation thereof*

In Figures 5 and 6 there is shown still another type of instrument which can be employed in carrying out my method of orienting a side wall sample or core. This instrument is somewhat similar to the magnetic type of instrument shown in Figure 1 because it is capable of recording only the inclination of the bore hole. No compass is embodied in the instrument so as to ascertain the direction of inclination, but this direction of inclination can be obtained by other instruments either before the sample is taken or after the sample is taken. The instrument shown is called a photographic drift indicator and is indicated by the letters MDI. The instrument is contained in a casing 63 which is attached to rod 42 of the sampler C by means of a suitable joint J². The instrument 64 within the barrel has on its lower end an orienting leg 65 which cooperates with another orienting leg 66 carried by the joint. Thus, when the instrument is in the barrel there must be a known relationship between the instrument and the joint and also the sampler by way of the rod 42. The lower part of the instrument 64 is shown in Figure 6 and, as seen in this figure, it comprises a plumb bob 67 connected for universal swinging movement by a gimbal structure 68. Above this plumb bob is a time controlled light. Carried by the plumb bob are suitable lenses 69 and 70. Below the lower end of the plumb bob is a disc carrying cup 71 in which a sensitized disc 72 is to be positioned, this disc being shown in plan view in Figure 7. The disc is mounted on a plug 73 which is arranged to be threaded into the lower end of the barrel containing the plumb bob.

As shown in Figure 7, the disc has a plurality of concentric circles for indicating degrees of inclination. The disc cup carries a pin 74 and when the disc is positioned in the cup, before assembly of the instrument for placing in the drill stem, this pin 74 will punch a hole, indicated at 75, in the disc. Thus there will be indicated on the disc the relationship between the disc and the instrument casing when it is in the instrument. When the instrument is operated by the functioning of the time controlled mechanism the lamp above the plumb bob will be lighted and this light will then be directed through the lenses 69 and 70 to produce on the sensitized disc a spot such as that indicated at 76 in Figure 7 which will indicate the angle of inclination of the well bore.

The time mechanism of the instrument will be set so that the instrument will operate and produce a record of the angle of inclination on the disc after the sample has been taken by a lowering of the drill stem and punching accomplished, all as already described. The upper end of the instrument can be provided with a spear 77 for attaching by an overshot device of a wire line. This will permit "go-deviling" the instrument and sampler into the drill stem S or lowering it by a line. If "go-deviling" is performed, the line can be run in after the sample is taken and connected to the instrument and sampler by means of the overshot device and spear head.

By using the photographic drift indicator instrument and obtaining the angle of inclination of the bore, together with the relationship existing between this angle of inclination and the point at the side of the bore at which the sample is taken, there will be no difficulty in orienting the sample or core taken from the side wall when the direction of the angle of inclination is known, such being obtained by another instrument or already previously known as a result of other surveys. When the spot 76 was placed upon the disc, the position this disc had with respect to the opening through which the sample was taken is known since the disc is positioned on a pin 74 of the cup carrier and this pin has a known relationship with the opening through which the sampler obtained the sample core, such known relationship resulting from the two orienting legs 65 and 66 and the direct connection with the sampler mandrel by way of the joint J² and the rod 42.

*Description of Figures 8 and 9 structure and operation thereof*

Referring now to Figures 8 and 9, there is disclosed an apparatus and method of orienting a side wall core when the core is to be taken by a rotary type side wall core sampler. The particular instrument which is shown as an example for obtaining the data so that orientation can be accomplished is a photographic drift indicator of the same type as used in the method of orienting shown in Figures 5, 6 and 7 and this instrument is also indicated by the letters MDI. The parts of this MDI instrument, which are shown in detail, are indicated by the same reference characters as those employed in describing the instrument in connection with the method disclosed in Figures 5, 6 and 7.

The rotary type side wall sampler, as disclosed in Figure 8, is of well known construction and need only be briefly described. As shown, there is provided a whipstock assembly W having therein at its lower end a whipstock member 78. The body of the whipstock assembly is tubular in form and arranged to have a sliding and rotatable mounting upon a tubular sub 79 which is secured to a sub 80 at the lower end of the drill stem. The upper end of the rotary sampler comprises a shaft 81 and the lower end is provided with two sections 82 and 83 connected by suitable universal joints. The lower section 83 is tubular in form to provide the core barrel and carries the core drill bit 84. Associated with this drill bit is a suitable core catcher, not being shown as it is well known structure employed in cutting and taking cores by a rotary drilling bit. The casing 63 of the MDI instrument is arranged to be connected to the shaft 81 of the core taking apparatus by means of an index sub 85. This index sub carries the orienting leg 66' extending into the lower end of the instrument casing 63 and arranged to cooperate with the other orienting leg 65 carried by the MDI instrument at its lower end. The MDI instrument has the disc cup 71 into which the disc 72 of sensitized paper will be placed, said disc cup carrying the pin 74 for punching the hole 75 in the disc which is below the lower end of the plumb bob 67, all as already described in connection with Figures 5 and 6.

The index sub carries a longitudinally extending groove 86 on its outer surface to thereby provide an index line. This index line will, if possible, be arranged to be in line with the index pin 74 in the disc carrying cup. Thus it will be known that the index line 86 will always have a predetermined relation to the disc hole 75 punched therein by the index pin.

In order that the rotary sampler can be driven by the drill stem it will be noted from Figure 8 that the upper end of shaft 81 is provided with a combination driver and latch 87 which will extend into a longitudinally extending groove 88 in sub 80 attached to the lower end of the drill stem so that driving of the sampler can be accomplished by the drill stem. The shaft 81 need not have down pressure applied thereto as the weight of the whole rotary sampler is sufficient to cause the bit 84 to perform drilling when it is rotated.

In carrying out my method of orienting side core samples obtained by the rotary side wall core sampler, the sub assembly will be attached to the lower end of the drill stem before it is lowered into the well bore. The whipstock assembly will be connected to the drill stem for non-rotation during this lowering by a suitable sheer pin connection indicated at 89. When the whipstock assembly reaches the lower end of the bore where the sample is to be taken from the side wall of the bore, the surface of the whipstock will be oriented into position by any well known method of orienting a whipstock. This will be done by suitable instruments and when it is oriented, that is, placed in the desired and known direction, the drill stem can be lowered to shear the shear pin 89 and thus free the whipstock assembly from the drill stem so the drill stem can rotate relative to the whipstock assembly W.

The core sampling structure, together with the MDI instrument attached thereto, will now be lowered into the drill stem and this will be accomplished either on a wire line or by "go-deviling." Before placing the instrument in the drill stem the timing mechanism on the instrument will be set so there will be sufficient time to take the core before the record is made on the sensitized disc.

When the core taking structure reaches the lower end of the drill stem, the combined driver and latch 87 on the shaft 81 thereof will be received into the longitudinal groove 88 in sub 80 so there will be a connection between the drill stem and the core taking apparatus. The core can now be taken by rotating the drill stem and this will result in the core bit 84 being rotated into the side wall of the bore because of the deflection accomplished by the whipstock member 78. After the drilling has accomplished the taking of the core, the core is tested to see if it is still integral with the earth's strata and if it is, then the necessary time is allowed to elapse so the survey instrument will operate. After this occurs the survey instrument and the core taking apparatus will be withdrawn from the bottom of the drill stem by a suitable wire line. This wire line will be connected to the upper end of the instrument by an overshot device. When the line is pulled, the latch 87 will be pulled inwardly so as to be withdrawn from groove 88. This will be accomplished by permitting the index sub 85 to have relative axial movement with respect to shaft 81. The core will be held in the lower section 83 of the core taking apparatus by means of the core catcher. It will not be disturbed in any way from the position it had at the time the survey instrument was operated. When the core taking apparatus is removed from the drill stem the index groove or line is then used as a reference point 86 and this line is carried down the core taking apparatus to the bottom of the core at the core bit where the core is then scribed so it will be known what position this core was in relation to the index line 86 and the record disc hole at the time the instrument operated.

With the operation of the instrument and the obtaining of angle of inclination of the bore and the relationship of the disc with respect to the core at the time the record was made, all information will now be available to orient the core which has been obtained. It will already be known in what direction the whipstock face was positioned at the time the core was taken because this whipstock face was oriented. The angle of the whipstock face with respect to the axis of the bore will be known and also what is the angle of inclination of the bore hole and the relationship between this angle of inclination and the core at the time the angle of inclination was obtained. With all of this information it will only be necessary to make proper calculations and the position of the core in the earth's strata will become known.

Being aware of the possibility of modifications in the structure shown as examples in which my invention is embodied and also that various types of different survey instruments and core taking apparatus can be used in carrying out the steps of my method of orienting side wall samples or cores and the obtaining of desired data, I desire it to be understood that the scope of the invention is not to be limited in any manner except in accordance with the appended claims.

What is claimed is:

1. In orienting structure of the class described, the combination with an earth boring drill stem, of apparatus for association therewith and operable by a manipulation of the drill stem to obtain a sample of the earth's formation from the side wall of the bore taken above the bore bottom and in a direction laterally of the longitudinal axis of the bore, means for obtaining data indicating a predetermined side of the sample when it was an integral part of the earth's formation, a survey instrument positionable in the drill stem above the sampler for obtaining recorded data as to the inclination of the axis of the bore where the sample is obtained, means for connecting the survey instrument with the sample obtaining apparatus, and means for indicating what directional position the axis of the sample had with respect to the axis of the bore when the sample was obtained.

2. In orienting structure of the class described, the combination with an earth boring drill stem, of apparatus for association therewith and operable by a manipulation of the drill stem to obtain a sample of the earth's formation from the side wall of the bore taken above the bore bottom and in a direction laterally of the longitudinal axis of the bore, means for obtaining data indicating the top and bottom sides of the sample when it was an integral part of the earth's formation, a single survey instrument positionable in the drill stem above the sampler for obtaining recorded data as to the inclination of the axis of the bore and the direction of the inclination from the vertical where the sample is obtained, means for connecting the survey instrument with the sample obtaining apparatus, and means for indicating what directional position the axis of the sample had with respect to the axis of the bore when the sample was obtained.

3. In orienting structure of the class described, the combination with an earth boring drill stem, of apparatus for association therewith and operable by a manipulation of the stem to obtain a sample of the earth's formation from the side wall of the bore taken above the bore bottom in a direction laterally of the longitudinal axis of the bore, means embodied in the sampler for marking the sample and for obtaining data indicating the relationship of the mark to the bottom side of the sample when it was an integral part of the earth's formation, a survey instrument positionable in the drill for obtaining recorded data as to the inclination of the axis of the bore where the sample is obtained, means for connecting the survey instrument with the sample obtaining apparatus, and means for indicating the relationship between record data obtained by the instrument and the direction of the axis of the sample to be known.

4. In orienting structure of the class described, the combination of an earth bore drilling stem, of a side wall sampler carried by the drill stem and operable by manipulation thereof for obtaining a sample of the earth's formation by a punching operation in a direction laterally of the axis of the stem, means embodied in the sampler for indicating which side of the sample was the bottom side at the time the sample was taken, means including a survey instrument positionable in the drill stem and connected to the sampler in a manner that the relationship is indicated for obtaining data on a record disc as to the inclination of the axis of the earth bore where the sample is taken, and means for indicating the position the disc had with respect to the lateral direction in which the sample was taken at the time the data was recorded.

5. In orienting structure of the class described, the combination of an earth bore drilling stem, of a side wall sampler for obtaining a sample of the earth's formation by a punching operation in a direction laterally of the axis of the stem and operable by manipulation of the drill stem, means embodied in the sampler for making a record of the low side of the sample at the time the sample was taken and for also marking the sample in a known relation to the record so that the low side will be known when the sample is removed, means including a survey instrument connected to the sampler in a manner that the relationship is indicated for obtaining data on a record disc as to the inclination of the axis of the earth bore where the sample is taken, and means for indicating the position the disc had with respect to the lateral direction in which the sample was taken at the time the data was recorded.

6. In orienting structure of the class described, the combination of an earth bore drilling stem, of a side wall sampler for obtaining a sample of the earth's formation by a punching operation in a direction laterally of the axis of the stem and operable by manipulation of the drill stem, means embodied in the sampler for indicating which side of the sample was the bottom side at the time the sample was taken, means including a survey instrument positionable in the stem and connected to the sampler in a manner that the relationship is indicated for obtaining data on a record disc as to the inclination of the axis of the earth bore where the sample is taken and also the direction of said inclination, and means for indicating the position the disc had with respect to the lateral direction in which the sample was taken at the time the data was recorded, said last named means comprising means having a predetermined relation with respect to the lateral direction and caused to be data recorded on the record disc.

7. In orienting structure of the class described, the combination with an earth boring drill stem, of apparatus for association therewith to obtain a sample of the earth's formation from the side wall of the bore taken above the bore bottom, said apparatus being of the rotary type including a core bit and employing a deflecting tool the deflecting surface of which will be set in a known direction, a survey instrument having a fixed connection with the sampler and capable of obtaining recorded data on a record member as to the inclination of the axis of the bore, and means for indicating the position of the record member with respect to the core cut by the drill bit at the time the instrument is operated and the record obtained, said core which is to be obtained having a connection with the earth's formation at the time the instrument is operated and the record made.

8. A method of obtaining data whereby a sample from the earth's formation can be oriented when the sample is taken from the side wall of an earth bore, said method comprising the connecting of a survey instrument to a sampler of the punching type so as to have a predetermined relationship therebetween, lowering both the sampler and instrument in connected relationship into the bore through a drill stem, taking the sample by manipulation of the drill stem, recording at the time of taking the sample the low side of the sample and then so recording data by operating the instrument that information as to the inclination of the bore will be obtained, said data being obtained on a record member which will have a known position with respect to the position of the sample when in the earth's formation and at the time the instrument operated to obtain the data.

References Cited in the file of this patent

UNITED STATES PATENTS

| | | |
|---|---|---|
| 1,932,612 | Williston | Oct. 31, 1933 |
| 2,141,828 | Schlumberger | Dec. 27, 1938 |
| 2,210,464 | O'Leary | Aug. 6, 1940 |
| 2,358,470 | Oswald | Sept. 19, 1944 |
| 2,489,566 | Engle | Nov. 29, 1949 |
| 2,544,979 | Brokaw et al. | Mar. 13, 1951 |
| 2,600,125 | Natland et al. | June 10, 1952 |